(12) United States Patent
Kim et al.

(10) Patent No.: US 10,326,139 B2
(45) Date of Patent: *Jun. 18, 2019

(54) ELECTROCHEMICAL CELL WITH MELANIN ELECTRODE

(71) Applicant: Carnegie Mellon University, Pittsburgh, PA (US)

(72) Inventors: Young Jo Kim, Pittsburgh, PA (US); Jay F. Whitacre, Pittsburgh, PA (US); Christopher J. Bettinger, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 238 days.

This patent is subject to a terminal disclaimer.

(21) Appl. No.: 15/211,945

(22) Filed: Jul. 15, 2016

(65) Prior Publication Data

US 2017/0018776 A1  Jan. 19, 2017

Related U.S. Application Data

(60) Provisional application No. 62/231,809, filed on Jul. 16, 2015.

(51) Int. Cl.
| | |
|---|---|
| *H01M 4/62* | (2006.01) |
| *H01M 10/36* | (2010.01) |
| *H01M 4/38* | (2006.01) |
| *H01M 4/60* | (2006.01) |
| *H01M 4/02* | (2006.01) |

(52) U.S. Cl.
CPC .............. *H01M 4/62* (2013.01); *H01M 4/38* (2013.01); *H01M 4/606* (2013.01); *H01M 10/36* (2013.01); *H01M 2004/027* (2013.01); *H01M 2004/028* (2013.01)

(58) Field of Classification Search
CPC ........ H01M 4/462; H01M 4/38; H01M 4/606; H01M 10/36; H01M 2004/028; H01M 2004/027
See application file for complete search history.

(56) References Cited

U.S. PATENT DOCUMENTS 4,366,216 A * 12/1982 McGinness ....... H01M 10/0562
429/152

OTHER PUBLICATIONS

Vreeke, M.S. et al., "Report of the Electrolytic Industries for the Year 1997," Journal of the Electrochemical Society, 1998, 145, (10), 3668-3696.

(Continued)

*Primary Examiner* — Jonathan G Leong
*Assistant Examiner* — Aaron J Greso
(74) *Attorney, Agent, or Firm* — Fish & Richardson P.C.

(57) ABSTRACT

An electrochemical cell includes an anode configured to produce multivalent cations during a discharge process, and a cathode comprising a catechol-bearing melanin. The cathode is configured to reversibly oxidize a catechol of the catechol-bearing melanin into a quinone by an extraction of the multivalent cation during a recharge process and reduce the quinone to the catechol by an insertion of the multivalent cation during the discharge process. The electrochemical cell includes an aqueous electrolyte solution in which the anode and the cathode are disposed, wherein the aqueous electrolyte solution is configured to transport the multivalent cations between the anode and the cathode.

20 Claims, 11 Drawing Sheets

(56) References Cited

OTHER PUBLICATIONS

Yoo, H.D. et al., "Mg rechargeable batteries: an on-going challenge," Energy & Environmental Science, 2013, 6, (8), 2265-2279.
Van Noorden, R., "The rechargeable revolution: A better battery," Nature 2014, 507, 26-28.
Ling, C. et al., "Study of the electrochemical deposition of Mg in the atomic level: Why it prefers the non-dendritic morphology," Electrochimica Acta 2012, 76, (0), 270-274.
Matsui, M., "Study on the electrochemically deposited Mg metal," Journal of Power Sources 2011, 196, (16), 7048-7055.
Sun, Y.-K., et al., "Nanostructured high-energy cathode materials for advanced lithium batteries," Nature Materials 2012, 11, (11), 942-947.
Liu, N. et al., "A pomegranate-inspired nanoscale design for large-volume-change lithium battery anodes," Nature Nanotechnology, 2014, 9, 187-192.
Bian, P. et al., "A novel thiolate-based electrolyte system for rechargeable magnesium batteries," Electrochimica Acta, 2014, 121, (0), 258-263.
Shao, Y., et al. "Coordination Chemistry in magnesium battery electrolytes: how ligands affect their performance," Scientific Reports 2013, 3.
Guo, Y. et al., "Boron-based electrolyte solutions with wide electrochemical windows for rechargeable magnesium batteries," Energy & Environmental Science, 2012, 5 (10), 9100-9106.
Aurbach, D., et al., "Progress in Rechargeable Magnesium Battery Technology," Advanced Materials, 2007, 19, (23), 4260-4267.
Kim, H.S. et al., "Structure and compatibility of a magnesium electrolyte with a sulphur cathode," Nature Communications, 2011, 2, 427.
Liang, Y. et al., "Rechargeable Mg Batteries with Graphene-like MoS2 Cathode and Ultrasmall Mg Nanoparticle Anode," Advanced Materials, 2010, 23, (5), 640-643.
Gregory, T.D., et al., "Nonaqueous Electrochemistry of Magnesium: Applications to Energy Storage," Journal of Electrochemical Society, 1990, 137, (3), 775-780.
Levi, E., "On the Way to Rechargeable Mg Batteries: The Challenge of New Cathode Materials," Chemistry of Materials, 2010, 22, (3), 860-868.
Jiao, L. et al., "Mg intercalation properties into open-ended vanadium oxide nanotubes," Electrochemistry Communications, 2005, 7, (4), 431-436.
NuLi, Y. et al., "Electrochemical Intercalation of Mg2+ in Magnesium Manganese Silicate and Its Application as High-Energy Rechargeable Magnesium Battery Cathode," Journal of Physical Chemistry C, 2009, 113, (28), 12594-12597.
Levi, E. et al., "New Insight on the Unusually High Ionic Mobility in Chevrel Phases," Chemistry of Materials, 2009, 21, (7), 1390-1399.
Mitelman, A. et al., "On the Mg Trapping Mechanism in Electrodes Comprising Chevrel Phases," ECS Transactions 2007, 3, (27), 109-115.
Singh, N. et al., "A high energy-density tin anode for rechargeable magnesium-ion batteries," Chemical Communications, 2013, 49, (2), 149-151.
Huskinson B. et al., "A metal-free organic-inorganic aqueous flow battery," Nature 2014, 505, (7482), 195-198.
Hernandez-Burgos, K et al., "Increasing the Gravimetric Energy Density of Organic Based Secondary Battery Cathodes Using Small Radius Cations (Li+ and Mg2+)," Journal of the American Chemical Society, 2013, 135, (39), 14532-14535.
Lindgren, J. et al., "Molecular preservation of the pigment melanin in fossil melanosomes," Nature Communications, 2012, 3, 824.
Glass, K. et al., "Direct chemical evidence for eumelanin pigment from the Jurassic period," Proceedings of the National Academy of Sciences, 2012.
Kim, Y.J. et al., "Biologically derived melanin electrodes in aqueous sodium-ion energy storage devices," Proceedings of the National Academy of Sciences, 2013, 110, (52), 20912-20917.
Kaxiras, E. et al., Structural Model of Eumelanin, Physical Review Letters, 2006, 97, (21), 218102.
Watt, A. et al., "The supramolecular structure of melanin," Soft Matter 2009, 5, (19), 3754-3760.
d'Ischia, M. et al., "Chemical and Structural Diversity in Eumelanins. Unexplored Bio-Optoelectronic Materials," Angewandte Chemie International Edition, 2009, 48, (22), 3914-3921.
Chen, C.-T. et al., "Self-Assembly of Tetramers of 5,6-Dihydroxyindole Explains the Primary Physical Properties of Eumelanin. Experiment, Simulation, and Design," ACS Nano, 2013, 7, (2), 1524-1532.
Hong, L. et al., "Current Understanding of the Binding Sites, Capacity, Affinity, and Biological Significance of Metals in Melanin,"Journal of Physical Chemistry B, 2007, 111, (28), 7938-7947.
Hong, L. et al., "Insight into the Binding of Divalent Cations to Sepia Eumelanin from IR Absorption Spectroscopy," Photochemistry and Photobiology, 2006, 82, (5), 1265-1269.
Mostert, A.B. et al., "Role of semiconductivity and ion transport in the electrical conduction of melanin," Proceedings of the National Academy of Sciences 2012.
Holten-Andersen, N. et al., "pH-induced metal-ligand cross-links inspired by mussel yield self-healing polymer networks with near-covalent elastic moduli," Proceedings of the National Academy of Sciences, 2011, 108, 2651-2655.
Grzyska, P.K. et al., "Metal ligand substitution and evidence for quinone formation in taurine/α-ketoglutarate dioxygenase," Journal of Inorganic Biochemistry, 2007, 101, (5), 797-808.
Balla, J. et al., "Copper(II)-catalyzed oxidation of catechol by molecular oxygen in aqueous solution," Inorganic Chemistry, 1992, 31, (1), 58-62.
Lee, H. et al., "Single-molecule mechanics of mussel adhesion," Proceedings of the National Academy of Sciences, 2006, 103, (35), 12999-13003.
Szpoganicz, B. et al., "Metal binding by melanins: studies of colloidal dihydroxyindole-melanin, and its complexation by Cu(II) and Zn(II) ions," Journal of Inorganic Biochemistry, 2002, 89, (1-2), 45-53.
Kim E. et al., "Redox Capacitor to Establish Bio-Device Redox-Connectivity," Advanced Functional Materials, 2012, 22, (7), 1409-1416.
Kim T.W. et al., "Nanoporous BiVO4 Photoanodes with Dual-Layer Oxygen Evolution Catalysts for Solar Water Splitting," Sciences 2014, 343, (6174), 990-994.
Wu, W. et al., "Microwave Synthesized NaTi2(P04)3 as an Aqueous Sodium-Ion Negative Electrode," Journal of the Electrochemical Society, 2013, 160, (3), A497-A504.
Liu Y. et al., Ion-Exchange and Adsorption of Fe(III) by Sepia Melanin, Pigment Cell Research, 2004, 17, (3), 262-269.
Korchev, A.S., et al., "Radical-Induced Generation of Small Silver Particles in SPEEK/PVA Polymer Films and Solutions: UV-vis, EPR, and FT-IR Studies," Langmuir, 2006, 22, (1), 374-384.
Muthu Lakshmi, R.T.S. et al., "Sulphonated poly(ether ether ketone): Synthesis and characterisation," Journal of Materials Science, 2005, 40, (3), 629-636.
Capozzi, V. et al, "Raman and optical spectroscopy of eumelanin films," Journal of Molecular Structure, 2005, 744-747, (0), 717-721.
Centeno, S.A., et al., "Surface enhanced Raman scattering (SERS) and FTIR characterization of the sepia melanin pigment used in works of art," Journal of Molecular Structure, 2008, 873, (1-3), 149-159.
Suzuki S. et al., "Characterization of doped single-wall carbon nanotubes by Raman spectroscopy," Carbon 2011, 49, (7), 2264-2272.
Zhang, W.F. et al., "Raman scattering study on anatase TiO 2 nanocrystals," Journal of Physics D: Applied Physics, 2000, 33, (8), 912-916.
McCarty, K.F. et al., "High-temperature Raman measurements of single-crystal YBa2Cu3O7-x," Physical Review B, 1988, 38, 2914.
Beidaghi, M. et al., "Capacitive energy storage in micro-scale devices: recent advances in design and fabrication of micro-supercapacitors," Energy & Environmental Science, 2014, 7, (3), 867-884.

(56) References Cited

OTHER PUBLICATIONS

Xu, Z., "Mechanics of metal-catecholate complexes: the roles of coordination state and metal types," Scientific Reports, 2013, 3.

Hong, L. et al, "Binding of Metal Ions to Melanin and Their Effects on the Aerobic Reactivity," Photochemistry and Photobiology, 2004, 80, (3), 477-481.

Salceda R. et al., "Calcium uptake, release and ryanodine binding in melanosomes from retinal pigment epithelium," Cell Calcium 2000, 27, (4), 223-229.

Wessells, C.D. et al., "Copper hexacyanoferrate battery electrodes with long cycle life and high power," Nature Communications 2011, 2, 550.

Li, Y. et al., "Advanced zinc-air batteries based on high-performance hybrid electrocatalysts," Nature Communications, 2013, 4, 1805.

Wang, W. et al., "A new cathode material for super-valent battery based on aluminium ion intercalation and deintercalation," Scientific Reports, 2013, 3, 3383.

Siegel, S.M. et al., "Autoxidation of Pyrogallol: General Characteristics and Inhibition by Catalase," Nature, 1958, 181, (4616), 1153-1154.

Kiss, T. et al., " Complexes of 3,4-dihydroxyphenyl derivatives, 9. Aluminum(3+) binding to catecholamines and tiron," Journal of the American Chemical Society, 1989, 111, (10), 3611-3614.

Meng, S. et al., "Theoretical Models of Eumelanin Protomolecules and their Optical Properties," Biophysical Journal, 2008, 94, (6), 2095-2105.

Meredith, P. et al., "Towards structure-property-function relationships for eumelanin," Soft Matter, 2006, 2 (1), 37-44.

Zhu Y. et al., "Carbon-Based Supercapacitors Produced by Activation of Graphene," Science 2011, 332, (6037), 1537-1541.

Chun, S.-E. et al., "Investigating the role of electrolyte acidity on hydrogen uptake in mesoporous activated carbons," Journal of Power Sources 2013, 242, (0), 137-140.

Coleman, J.N. et al., "Two-Dimensional Nanosheets Produced by Liquid Exfoliation of Layered Materials," Sciences 2011, 331, (6017), 568-571.

Yang, S. et al., "Exfoliated Graphitic Carbon Nitride Nanosheets as Efficient Catalysts for Hydrogen Evolution Under Visible Light," Advanced Materials, 2013, 25, (17), 2452-2456.

Hong, S. et al., "Poly(norepinephrine): Ultrasmooth Material-Independent Surface Chemistry and Nanodepot for Nitric Oxide," Angewandte Chemie International Edition 2013, 52, (35), 9187-9191.

Kumar, S. et al., "Chemistry and Biological Activities of Flavonoids: An Overview," The Scientific World Journal 2013, 16.

Wang, X. et al., "Three-dimensional strutted graphene grown by substrate-free sugar blowing for high-power-density supercapacitors," Nature Communications 2013, 4, 2905.

\* cited by examiner

ELECTROCHEMICAL CELL WITH MELANIN ELECTRODE

CLAIM OF PRIORITY

This application claims priority under 35 U.S.C. § 119(e) to provisional U.S. Patent Application No. 62/231,809, the entire contents of which are hereby incorporated by reference.

GOVERNMENT RIGHTS

This invention was made with government support under CHE0130903 and CHE1039870 awarded by the National Science Foundation. The government has certain rights in the invention.

BACKGROUND

Many cathode materials that can support rapid and reversible insertion of lithium ions. Conversely, very few cathode materials can achieve reasonable charge storage capacities and cycling stability in secondary multivalent batteries. There are many practical challenges that limit widespread adoption of secondary multivalent batteries. For example, two such challenges include the design of electrolytes with large voltage stability windows with the appropriate interfacial stability that are able to solvate cation salts sufficiently, and the discovery and development of electrode materials that exhibit sufficient specific capacity at usable current densities. One prominent challenge facing Mg batteries is the sluggish insertion (extraction) kinetics of $Mg^{2+}$ into (from) cathodes, which can result in in a high redox polarization effect, resulting in a lower than desired round-trip voltage efficiency.

SUMMARY

This document describes an electrochemical cell including an anode configured to produce multivalent cations during a discharge process, a cathode including a catechol-bearing melanin, and an aqueous electrolyte solution in which the anode and the cathode are disposed, wherein the aqueous electrolyte solution is configured to transport the multivalent cations between the anode and the cathode. The cathode is configured to reversibly reduce the quinone to the catechol by an insertion of the multivalent cation during the discharge process and oxidize a catechol of the catechol-bearing melanin into a quinone by an extraction of the multivalent cation during a recharge process.

In some examples, reducing the quinone to the catechol by the insertion of the multivalent cation during the discharge process includes reducing the quinone to the catechol using a two-proton reduction process stabilized by a semiquinone, and forming a coordinated bond between the catechol and the multivalent cation. In some examples, the multivalent cation comprises $Mg^{2+}$. In some examples, a cell potential of the discharge process is greater than 0.7 volts. In some examples, reversibly oxidizing the catechol of the catechol-bearing melanin into the quinone by the extraction of the multivalent cation during the recharge process includes oxidizing the catechol into the quinone using a two-electron oxidation process stabilized by a semiquinone, and extracting the multivalent cation from the cathode. In some examples, the catechol-bearing melanin includes one or more eumelanin pigments. In some examples, the cathode further includes a composition of 80% the catechol-bearing melanin, 5-10% a conductor, and 5-10% a mechanical binder. In some examples, the cathode is further configured to exhibit a charge storage capacity greater than 60 $mAhg^{-1}$ after at least 500 charge-discharge cycles. In some examples, the catechol-bearing melanin includes a surface area greater than 20 $m^2g^{-1}$, the surface area of the catechol-bearing melanin being increased relative to a characteristic surface area of the catechol-bearing melanin by dispersion of the granules of the catechol-bearing melanin using an exfoliation strategy.

In some examples, the anode is configured to produce one or more divalent cations including $Mg^{2+}$, $Ca^{2+}$, $Cu^{2+}$, $Zn^{2+}$, $Fe^{2+}$, $Fe^{2+}$, or $Al^{2+}$. In some examples, the aqueous electrolyte solution includes $Mg(NO_3)_2$ or $MgSO_4$. In some examples, the cathode is configured to maintain a coulombic efficiency value greater than 98% after at least 500 charge-recharge cycles. A form-factor between the anode and the cathode can include a coin cell form-factor or a cylindrical cell form-factor. The anode and the cathode together are configured to provide a cell potential of at least 1.2 volts during a charged state of the electrochemical cell. The anode, cathode, and aqueous solution can be environmentally benign and ingestible.

In some examples, the electrochemical cell includes an anode configured to produce $Mg^{2+}$ cations during a discharge process and to receive $Mg^{2+}$ cations during a recharge process, a cathode comprising a catechol-bearing melanin, the cathode configured to reversibly reduce the quinone to the catechol by an insertion of the $Mg^{2+}$ cation during the discharge process and oxidize a catechol of the catechol-bearing melanin into a quinone by an extraction of the $Mg^{2+}$ cation during a recharge process, and an aqueous $Mg(NO_3)_2$ solution in which the anode and the cathode are disposed, wherein the aqueous $Mg(NO_3)_2$ solution is configured to transport the $Mg^{2+}$ cations between the anode and the cathode.

The details of one or more implementations are set forth in the accompanying drawings and the description below. Other features, objects, and advantages will be apparent from the description and drawings, and from the claims.

DETAILED DESCRIPTION

Figure 1:
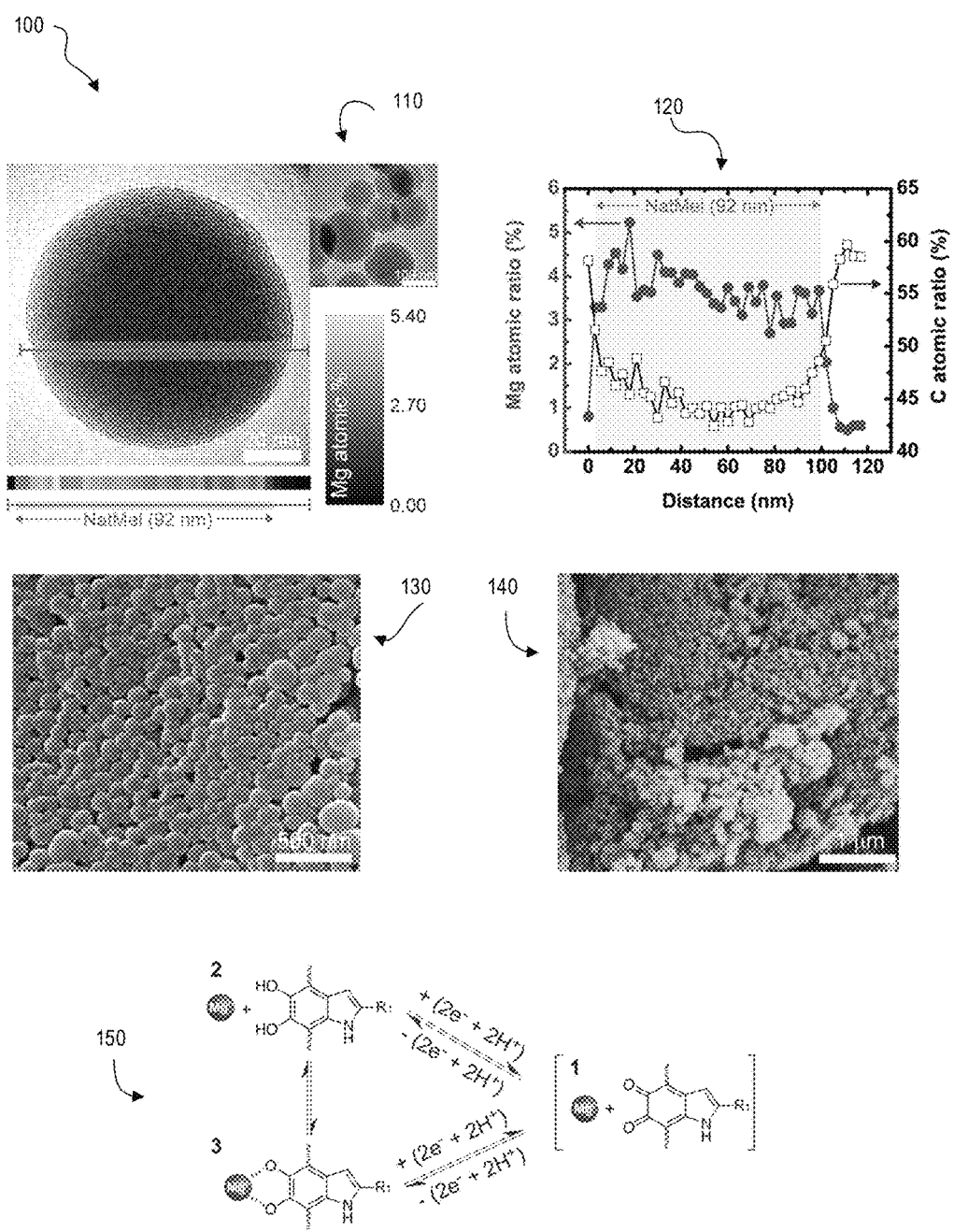
FIGS. 1-10 include graphs depicting data measurements.

This document describes catechol-mediated cycling stability in secondary multivalent electrochemical cells (e.g., batteries) using eumelanin cathodes. For example, the electrochemical cell includes organic compounds that serve as electrode materials for use in a secondary multivalent battery. The electrochemical cell described herein preserves charge storage capacity and cycling stability in cathodes of secondary multivalent batteries.

The electrochemical cell can be a rechargeable multivalent ion battery. The electrochemical cell can include a multivalent metal as an electrode. For example, the multivalent metal can include magnesium (Mg) as an anode. Magnesium anodes have a theoretical specific volumetric capacity that is roughly double that of Li (3833 $mA\,h\,cm^{-3}$ compared to 2046 $mA\,h\,cm^{-3}$). In some examples, for the electrochemical cell, magnesium is environmentally benign, earth abundant, stable in atmospheric conditions, and less expensive than lithium. In some examples, a multivalent magnesium can be used for secondary batteries because $Mg^{2+}$ cations can be deposited on magnesium metal anodes, such as from an aqueous electrolyte solution, without dendrite formation on the anode. This property improves the cycle stability of secondary multivalent batteries. For example, the lattice structure of magnesium can be persevered over more charge/discharge cycles.

The electrochemical cell includes cathode materials that are capable of rapid and reversible cation (e.g., $Mg^{2+}$) insertion. For example, the electrochemical cell includes a cathode material composed of eumelanin (melanin) pigments derived from *Sepia officinalis*. In some examples, melanin-based cathodes exhibit charge storage capacities of greater than 60 mA h $g^{-1}$ over 500 cycles when operating in half-cell configuration with aqueous electrolytes. High cycling stability in melanin cathodes is attributed to catechol groups. Redox active catechols form coordination bonds with divalent $Mg^{2+}$ ions during half-cell discharge. Oxidation of catechols into o-quinones in a concerted two-electron, two-proton process permits extraction of $Mg^{2+}$ during charge and recharge cycles with a voltage hysteresis of 0.7-0.8 V. The catechol-bearing melanins of the electrochemical cell can permit rapid and reversible $Mg^{2+}$ extraction. As such, the biologically derived pigments potentially can be used as cathodes in the electrochemical cell, such as for a secondary multivalent battery. In some examples, rechargeable multivalent batteries can be used for post-Li electrochemical storage systems.

The chemistry of redox-active quinones can be used for electrochemical storage systems such as flow cells. In some examples, quinones participate in coordinated two-electron, two-proton oxidation processes via intermediates that are stabilized by semiquinones. Concerted two-electron oxidation of quinone-based cathodes can be harmonized with extraction of divalent $Mg^{2+}$ ions from the cathode. The balanced stoichiometry facilitates insertion and removal of $Mg^{2+}$ ions during charging cycles. This mechanism preserves charge storage capacity and cycling stability in cathodes of the electrochemical cell, such as for secondary magnesium batteries.

In some examples, redox active melanins are used as electrode materials. Eumelanins, hereby referred to as melanins for simplicity, represent several classes of naturally occurring pigments found in organisms such as *Homo sapiens* and *Sepia officinalis*. In some examples, the melanins (e.g., NatMel, or natural melanin from *Sepia officinalis*) consist of homogenous nanometer scale textured granules (see e.g., FIG. 1) with a specific surface area of 19.9 m2 $g^{-1}$. Melanin granules are composed of extended hetero-aromatic networks with a characteristic d-spacing of 3.8 Å. In some examples, melanin granules contain a high density of polyphenols primarily in the form of catechols. For example, such melanins can be called catechol-bearing melanins. Melanin reversibly binds cations through the formation of organometallic complexes. In some examples, monovalent cations associate with pendant carboxylates and aromatic amines within melanins through coulombic interactions. In some examples, multivalent cations bind to redox active catechol groups via coordination bonds.

In some examples, during charging of the electrochemical cell, catechols can be reversibly oxidized into ortho (o)-quinones in a concerted two-electron, two-proton removal process ($-2H^+$; $-2e^-$). In some examples, catechols exhibit a strong affinity to divalent and polyvalent cations (e.g., having energies of 0.95 eV) including $Mg^{2+}$ (e.g., see FIG. 1). Multivalent cation binding affinity is stronger in catechols compared to oxidized o-quinones. Concerted redox reactions, redox-dependent differential cation binding affinity, and nanoscale architecture collectively facilitate $Mg^{2+}$ insertion and removal in melanin-based cathodes for use in secondary multivalent batteries.

The melanin electrodes exhibit electrochemical behavior. The electrochemical behavior of melanins in Mg-containing buffers can be measured by cyclic voltammetry (see e.g., FIG. 2) at a scan rate of 2 $mVs^{-1}$. In some examples, the first cycle of oxidation and reduction sweeps does not produce significant cathodic or anodic peaks. A prominent and stable cathodic peak at 0.156 V (vs. SHE) can emerge after more than 25 redox cycles (see e.g., FIG. 2). In some examples, two anodic peaks also evolve as the number of the redox cycles increases. The single cathodic peak corresponds to simultaneous magnesium removal and concerted oxidation of catechols to o-quinones. The peak cathodic current increases with cycle number. This behavior can be attributed to the gradual conversion of catechols in pristine melanin electrodes to o-quinones at more positive potentials during redox cycling. This conversion reaction of catechols to o-quinones can be rate-dependent, and the transition may happen in a fewer cycles with slower scan rates. Furthermore, the increase in peak cathodic and anodic currents requires successive oxidation and reduction cycles. In some examples, isolated reduction (oxidation) cycles produce anodic (cathodic) features with peak currents that become smaller in amplitude as the cycle number increases (See e.g., FIG. 2). CV spectra of melanin electrodes in aprotic solvents can also exhibit cathodic and anodic reactions with peak currents that are smaller compared to spectra recorded in aqueous conditions. In some examples, CV spectra of melanin can exhibit comparable redox activity across different counterions (see e.g., FIG. 3). As such, the redox behavior of melanin electrodes is governed by concerted two-electron, two-proton processes that convert catechols to o-quinones during oxidation. $Mg^{2+}$ loading and unloading occur at specific potentials such as via the proposed mechanism described in FIG. 1.

In some examples, the electrochemical cell includes inorganic cathode materials that can overcome the strong polarization of divalent cations to access the advantages of increased volumetric capacity compared to monovalent cations. For example, cathode material can include Chevrel-phase molybdenum chalcogenides ($MoS_{8-y}Se_y$), vanadium oxide ($V_2O_5$) nanowires, nanostructured silicates, $TiS_2$ nanotubes, and other compounds. These materials exhibit charge storage capacities from 25-200 mA h $g^{-1}$ at less than 2 volts with Mg/$Mg^{2+}$. Furthermore, coloumbic efficiencies can be between 85-99.9%, and variable cycling stability. $Mo_6S_{8-y}Se_y$ cathodes offer enhanced performance compared to oxides because sulfides exhibit reduced iconicity. The attenuated electrostatic force between $Mg^{2+}$ and sulfides also increases cation mobility. Inorganic materials are subject to irreversible $Mg^{2+}$ insertion, which reduces both cycle stability and coulombic efficiency. Current strategies for improving cathode performance in secondary multivalent batteries include screening $Mg^{2+}$ cations with anion groups and reducing the characteristic length scale of cathode structures. Poor Mg insertion into $V_2O_5$ microcrystalline can be improved by partially shielding the charge of $Mg^{2+}$ by using water as co-solvent.

Referring to FIG. 1, data 100 shows a microstructure and an atomic analysis of a melanin cathode. Image 110 shows bright field TEM images of $Mg^{2+}$-discharged melanin that highlight the amorphous structure of melanin granules. An overlay of a line scan of Mg measurements using EDX-STEM is shown. In graph 120, linear atomic profiles of Mg and C are shown in across single melanin after magnesium discharge. SEM images of melanin aggregates are shown in image 130. Diagram 140 shows coordinated Mg coupling and redox activity in catechols in Melanin during discharge/charge. State 1 and 3 represent the melanin in charged and discharged states, respectively. State 2 represents an intermediate state of a catechol group prior to forming a coordination bonding. The theoretical cell potential between 1 and 3 is $\Delta E^0_{1 \to 3}=+0.83V$. Detailed calculations are shown in Table 1, below.

Figure 2:
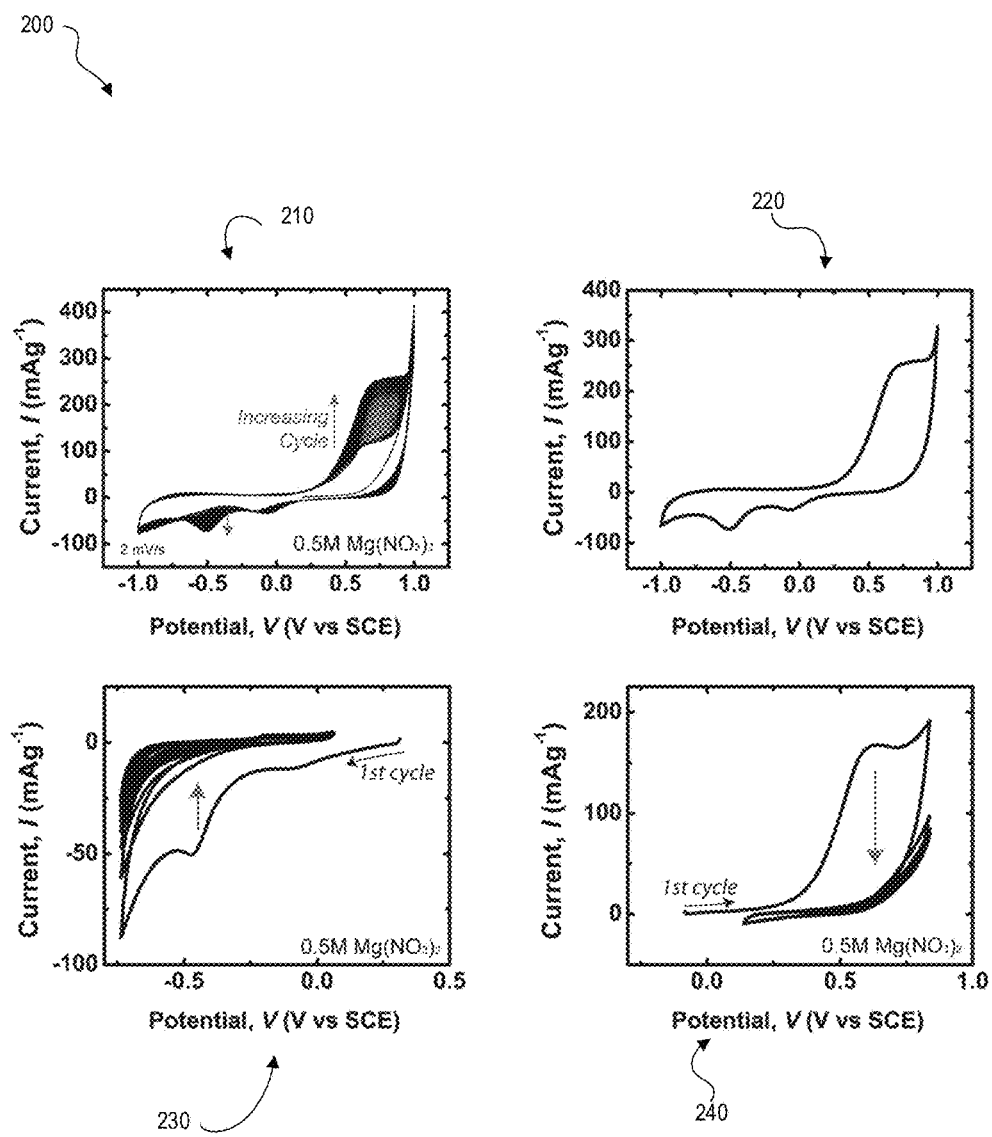

Referring to FIG. 2, data 200 shows a cyclic voltammetry analysis of melanin with magnesium. Graph 210 shows current vs. voltage (CV) for 1-50 cycles of melanin are measured in 0.5 M $Mg(NO_3)_2$. Graph 220 shows a single cathodic peak and two anodic peaks that are present in CV spectra measured during 50-100 cycles. The cathodic peak corresponds to simultaneous $Mg^{2+}$ removal and oxidation of catechols to o-quinones. Isolated CV spectra are measured at negative potentials in graph 230 and positive potentials in graph 240. No redox peaks are present after the first cycle. Scan rates of all CV spectra are 2 mV $s^{-1}$.

Figure 3:
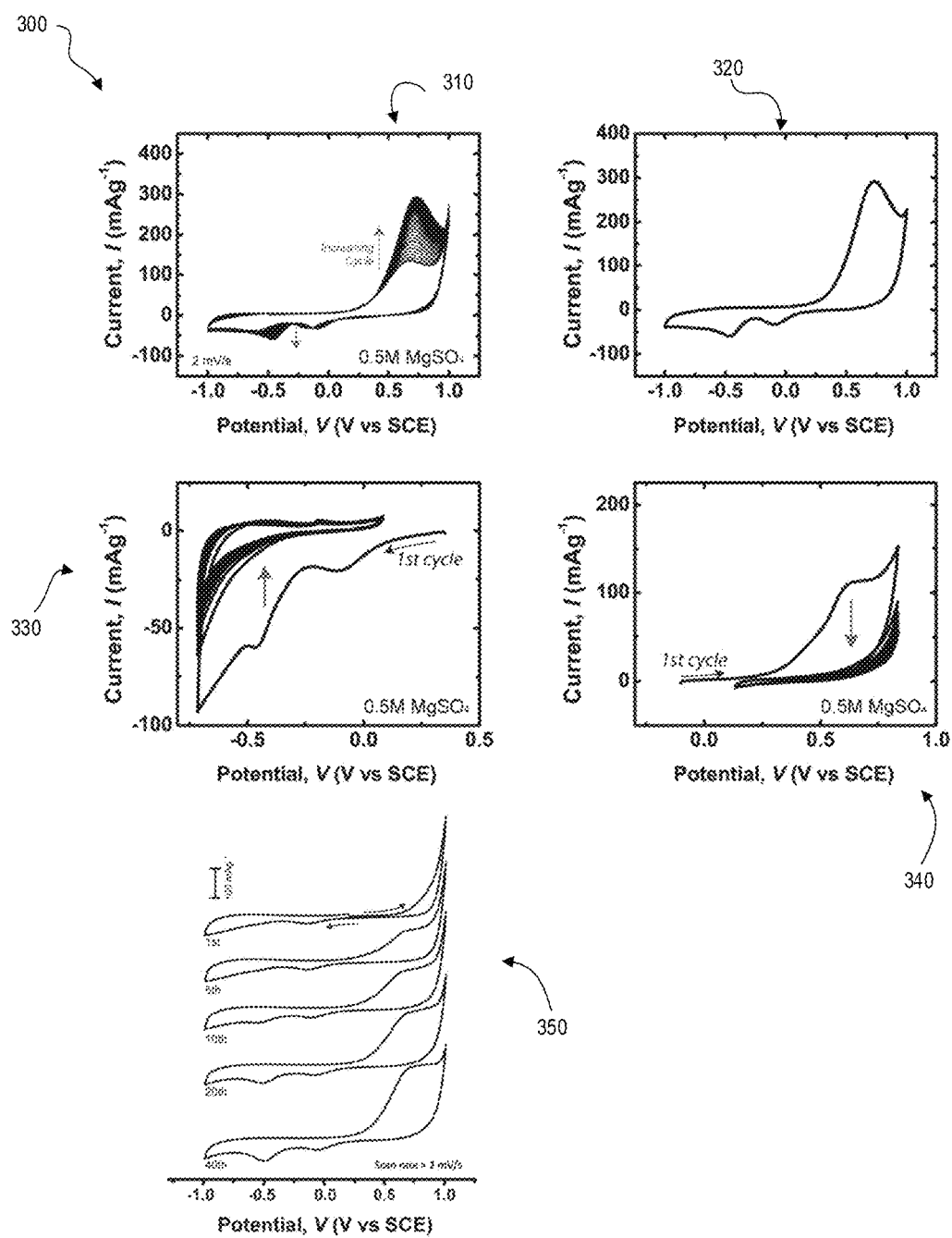

Referring to FIG. 3, data 300 showing cyclic voltammetry spectra of melanin with magnesium are presented. Graph 310 shows current vs. voltage (CV) for 1-50 cycles of melanin measured in 0.5 M $MgSO_4$. Graph 320 shows one cathodic peak and two anodic peaks that are present in CV spectra measured during cycles 50-100. The cathodic peak corresponds to simultaneous $Mg^{2+}$ removal and oxidation of catechols to o-quinones in a concerted reaction. CV spectra were also measured by segmenting the entire cycle into components of negative potential sweeps in graph 330 and positive potential sweeps in graph 340. No redox peaks are present after the first cycle. Graph 350 shows individual CV spectra that are measured in 0.5 M of $Mg(NO_3)_2$ shown for the 1st, 5th, 10th, 20th, and 40th cycles. The scan rate used for all CV spectra was 2 mV $s^{-1}$.

Figure 4:
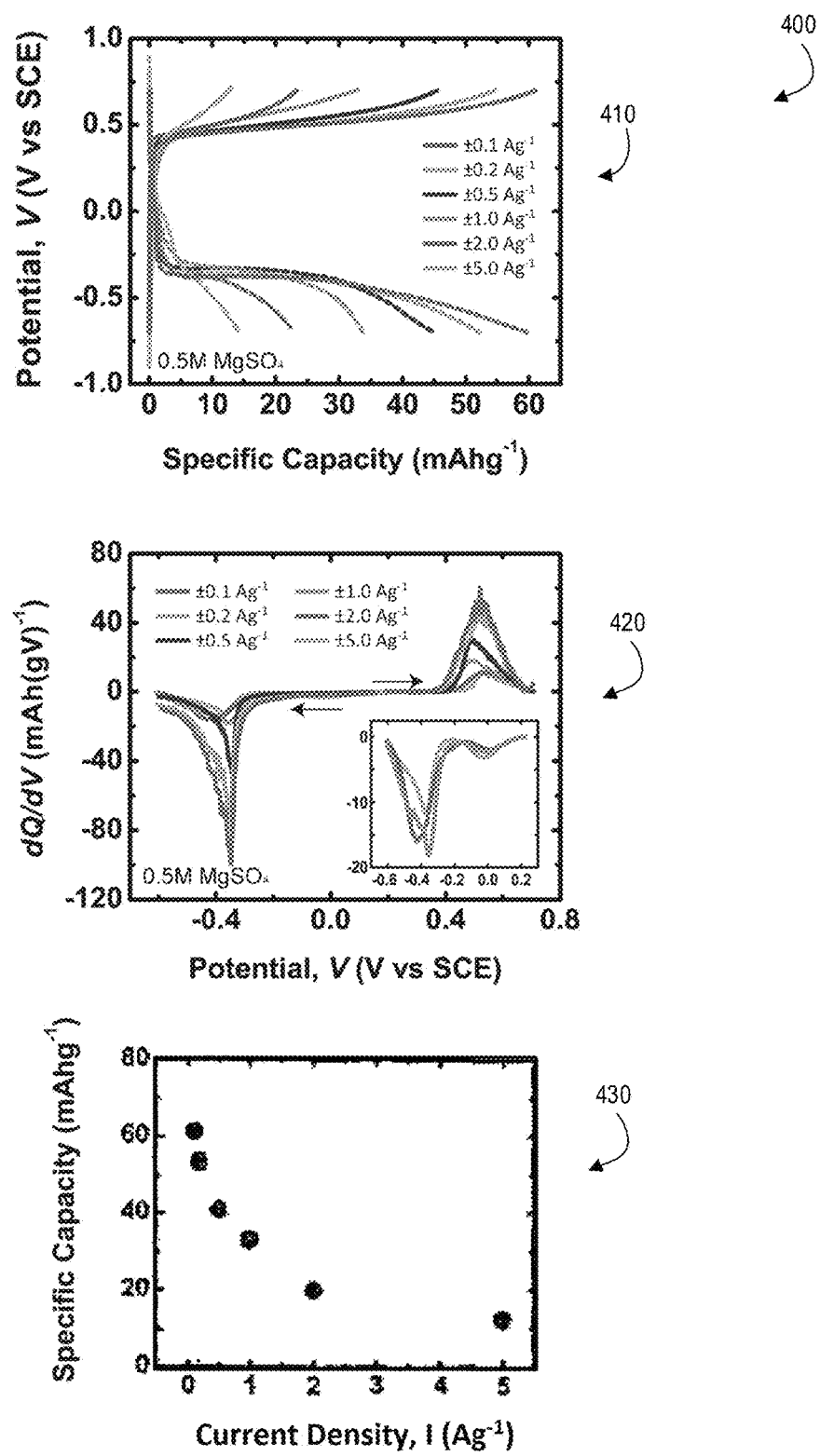

Referring to FIG. 4, data 400 shows an electrochemical analysis of melanin. Graph 410 shows galvanostatic potential profiles for the rechargeable $Mg^{2+}$ melanin electrode are measured for different current densities in 0.5 M $Mg(NO_3)_2$. Graph 420 shows differential capacities (dQ/dV) vs. potential (V) plots. The potential associated with $Mg^{2+}$ insertion and extraction from melanin is comparable across both CV and galvanostatic charge-discharge measurements. Graph 430 shows specific capacities of Melanin electrodes with different current densities.

Figure 5:
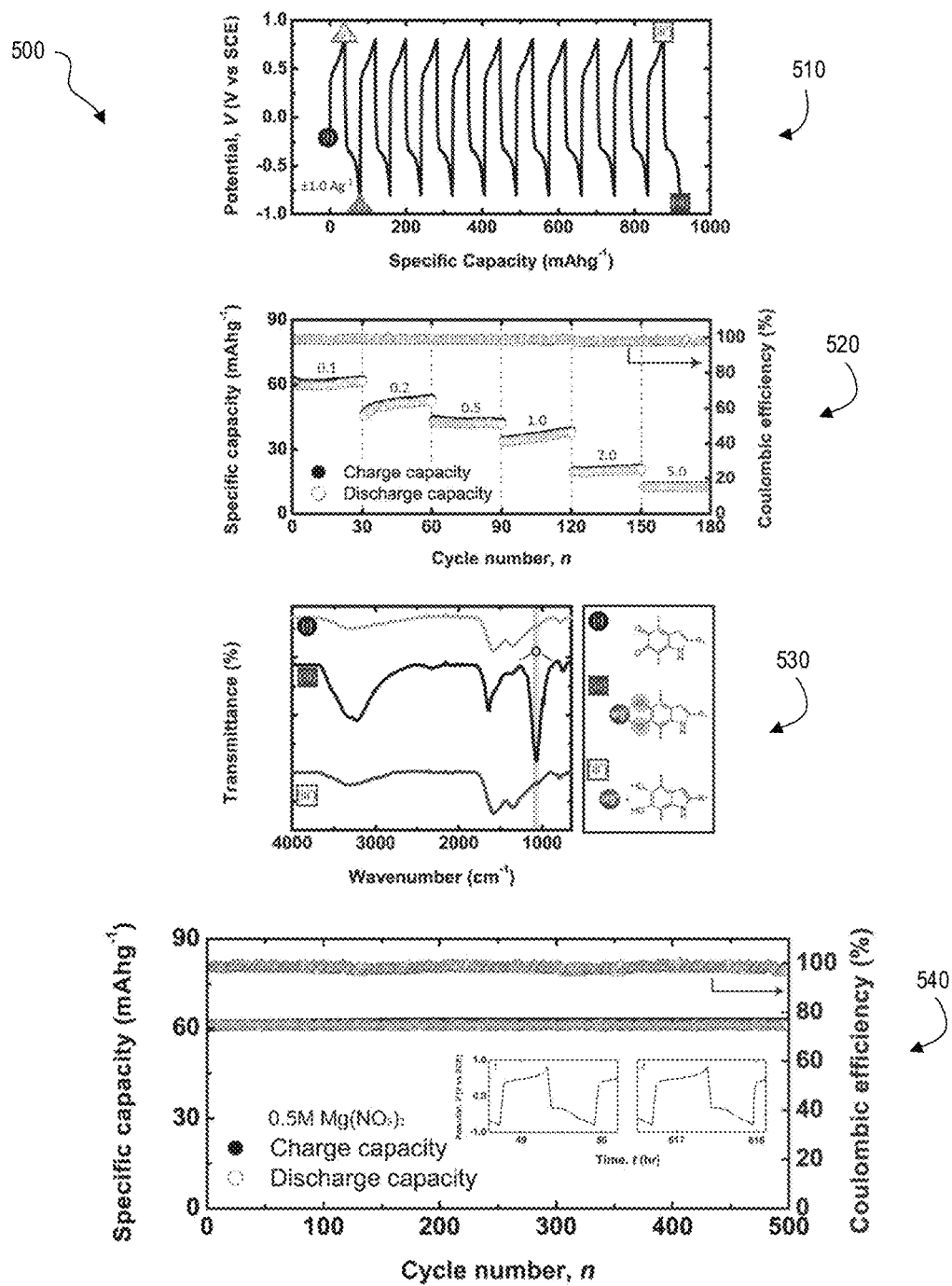

Referring to FIG. 5, data 500 shows charge/discharge and coulombic efficiencies of melanin. Graph 500 shows galvanostatic charge-discharge cycles of Melanin electrodes in 0.5 M $Mg(NO_3)_2$ with the current density of ±1.0 A $g^{-1}$. Cycles (1-10) are displayed from 30 cycles. Graph 520 shows melanin stable capacities of 61.6±0.3 mA h $g^{-1}$ from current density of 0.1 A $g^{-1}$ while retaining 60.8±0.7 mA h $g^{-1}$, even after 150 cycles at the various current densities. Graph 530 shows FT-IR spectra of Melanin that are measured for (i) pristine, (iii) discharged, and (iii) charged after 30 discharge/charge cycles. The transient and distinctive stretch at 1080 $cm^{-1}$ and ether bonds are formed and disrupted during charge and discharge cycles. Graph 540 shows reversible charge/discharge cycles (500 cycles) of melanin cathodes measured in 0.5M $Mg(NO_3)_2$ with the current density of ±0.1 $Ag^{-1}$. Melanin cathodes exhibit stable specific capacities of greater than 61.3±0.8 mA h $g^{-1}$ after 500 cycles. Coulombic efficiencies are maintained in the rage of greater than 99.2%. Insets represent the curves from initial (*) and final (#) charge-discharge cycles.

Figure 6:
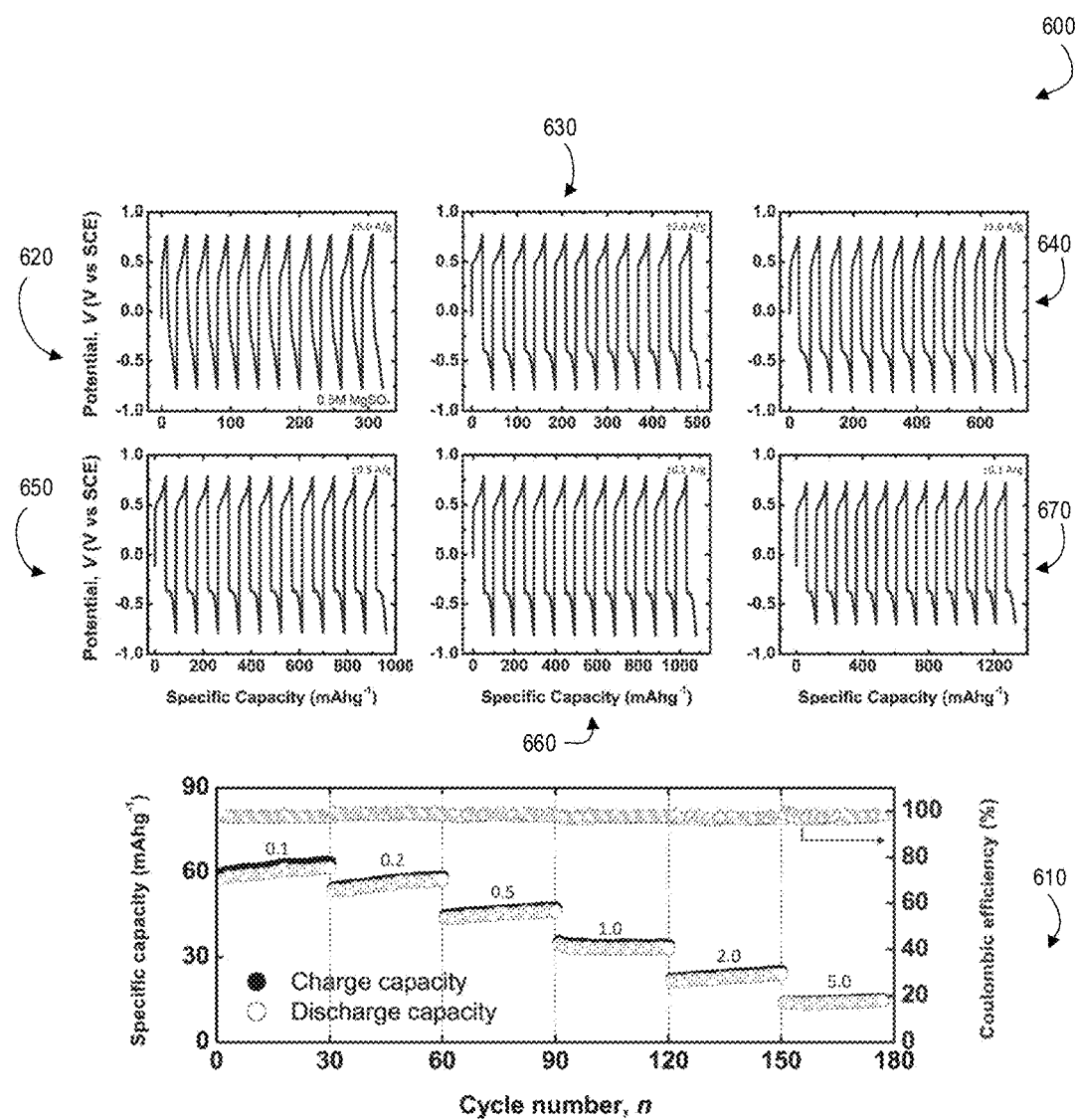

Referring to FIG. 6, data 600 shows cyclic stability of melanin in an $MgNO_3$ electrolyte. Graph 610 shows the cycle number against a specific capacity (mA $h^{g-1}$) in the context of a coulombic efficiency (%). Reversible charge-discharge cycles of melanin electrodes were measured in 0.5 M $Mg(NO_3)_2$ with the current density of ±0.1, ±0.2, ±0.5, ±1.0, ±2.0, and ±5.0 A $g^{-1}$ for graphs 620, 630, 640, 650, 660, and 670, respectively. The first 10 of 30 total cycles are shown. Specific capacities and coulombic efficiencies are shown as a function of different discharge for 30 cycles.

Figure 7:
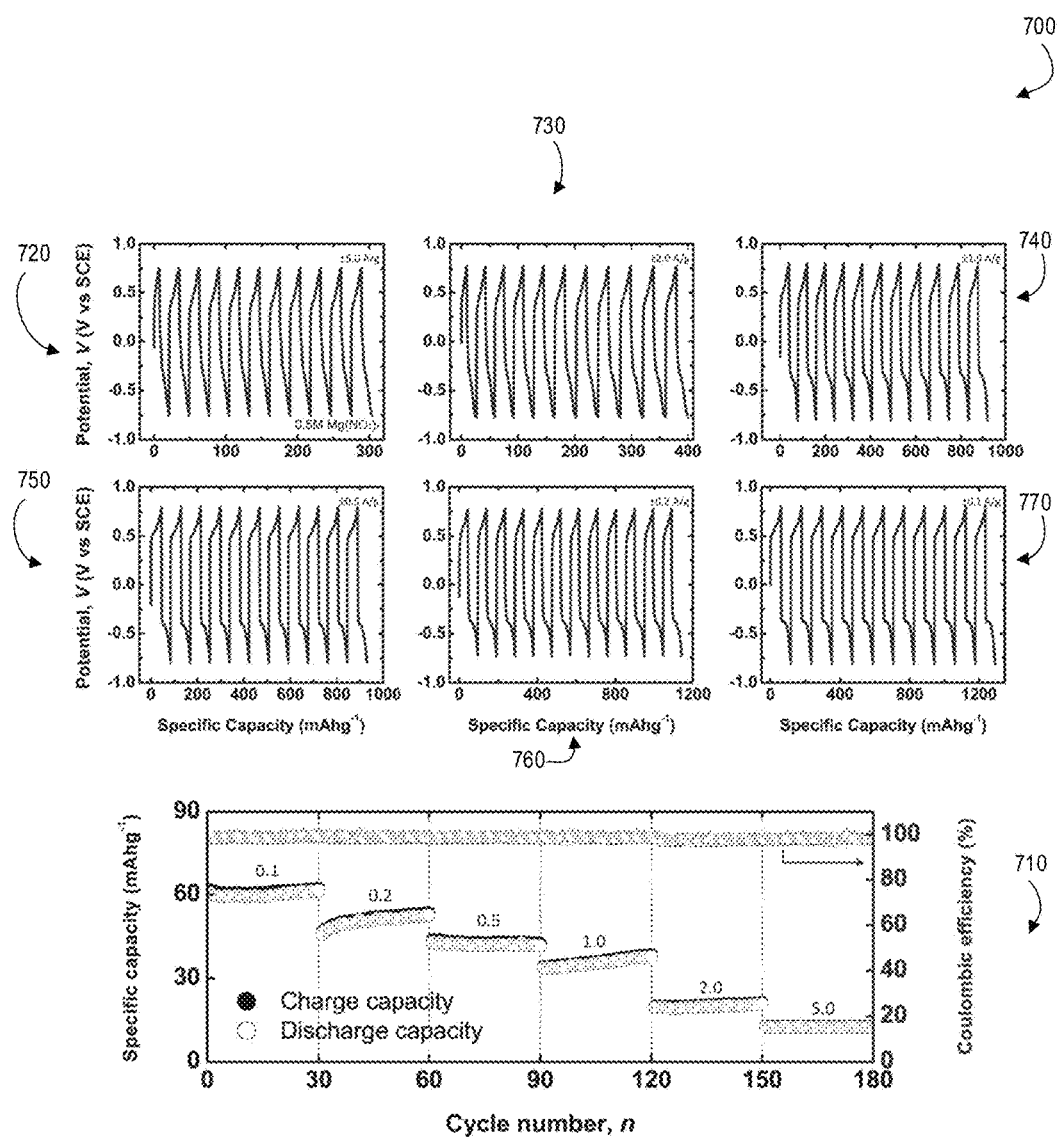

Referring to FIG. 7, data 700 shows cyclic stability of melanin in $MgSO_4$ electrolyte. Graph 710 shows the cycle number against a specific capacity (mA h $g^{-1}$) in the context of a coulombic efficiency (%). Reversible charge-discharge cycles of melanin electrodes were measured in 0.5 M $MgSO_4$ with the current density of ±0.1, ±0.2, ±0.5, ±1.0, ±2.0, and ±5.0 A $g^{-1}$ for graphs 720, 730, 740, 750, 760, and 770, respectively. The first 10 of 30 total cycles are shown. Specific capacities and coulombic efficiencies are shown as a function of different discharge for 30 cycles.

Figure 8:
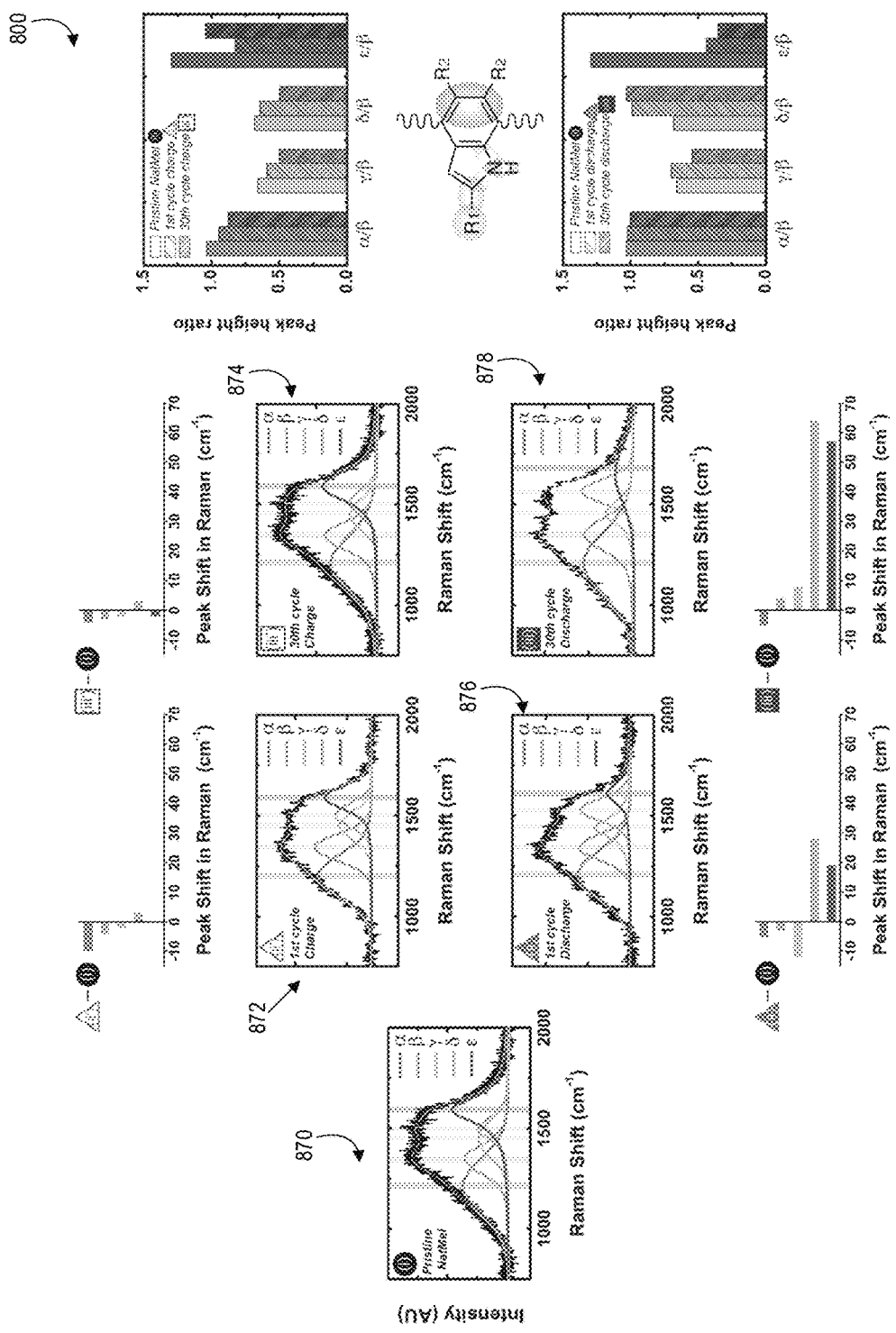

Referring to FIG. 8, data 800 shows spectroscopic analysis of Mg charge/discharge, including Raman spectra of Melanin electrode. Graphs 870, 872, 874, 876, and 878 show a number of curves representing (i) pristine Melanin; Melanin after 1 cycle of (ii) discharge and (ii') charge; and Melanin after 30 cycles of (iii) discharge and (iii') charge. Graphs 870, 872, 874, 876, and 878 further show raw spectra that are deconvolved into five bands (α-ε) using a Voigt function. The sum of five Voigt fits are shown. Peak shifts are shown relative to pristine melanin. Peak height ratios are calculated relative to the complementary C—N (β curve) groups in pyrrole. Comprehensive details about Raman shifts are given in Table 2, reproduced below.

Figure 9:
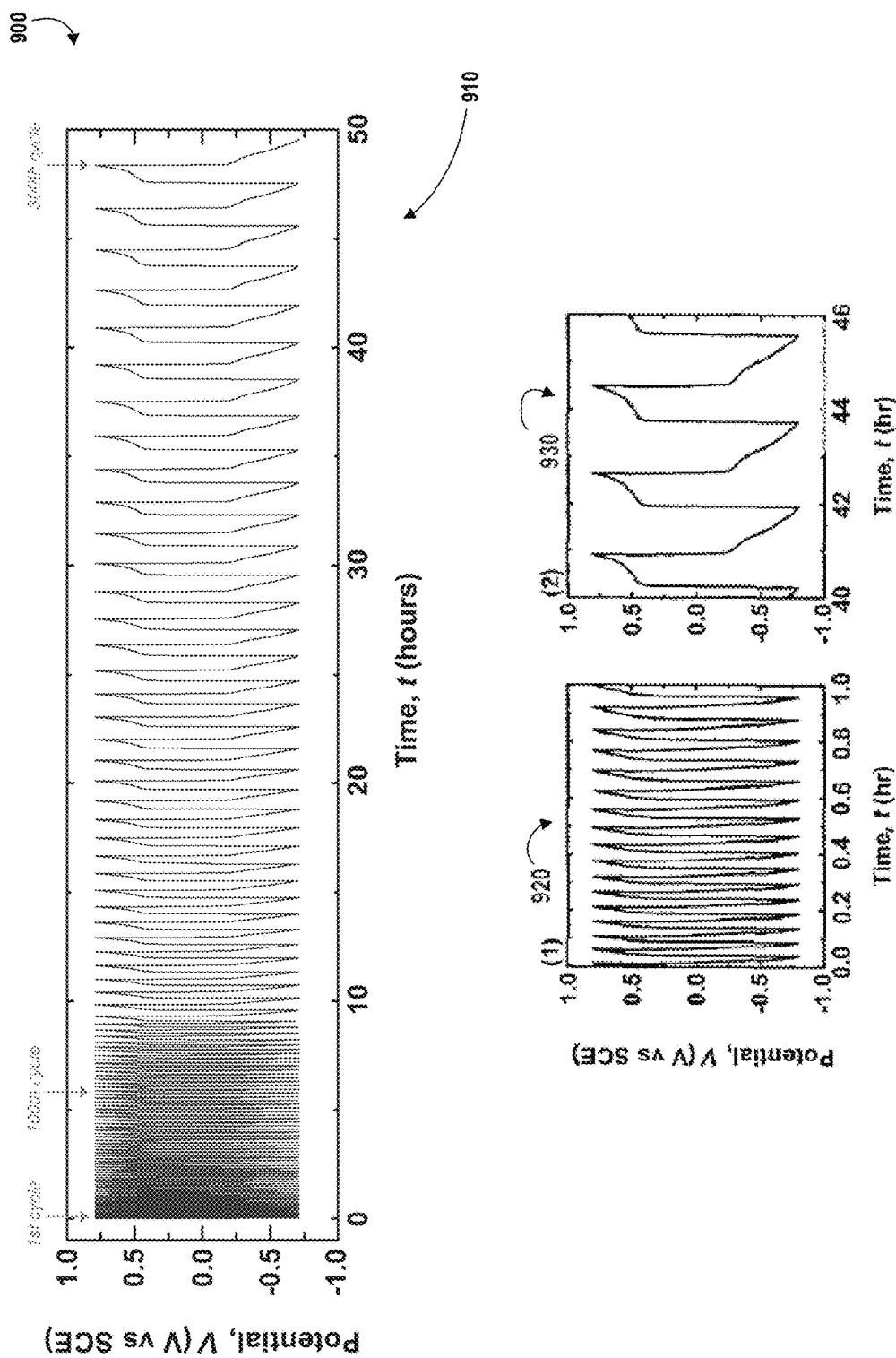

Referring to FIG. 9, data 900 shows cyclic charge/discharge of pristine melanin. Pristine melanin exhibit potential profiles that are similar to pseudo-capacitors by galvanostatic cyclic charge/discharge in 0.5 M $Mg(NO_3)_2$ with the current density of ±0.1 A $g^{-1}$. Potential plateaus during charge and discharge cycles emerge after more than 100 cycles. Graphs 910, 920, and 930 each show a portion of the potential profiles over different time ranges.

Figure 10:
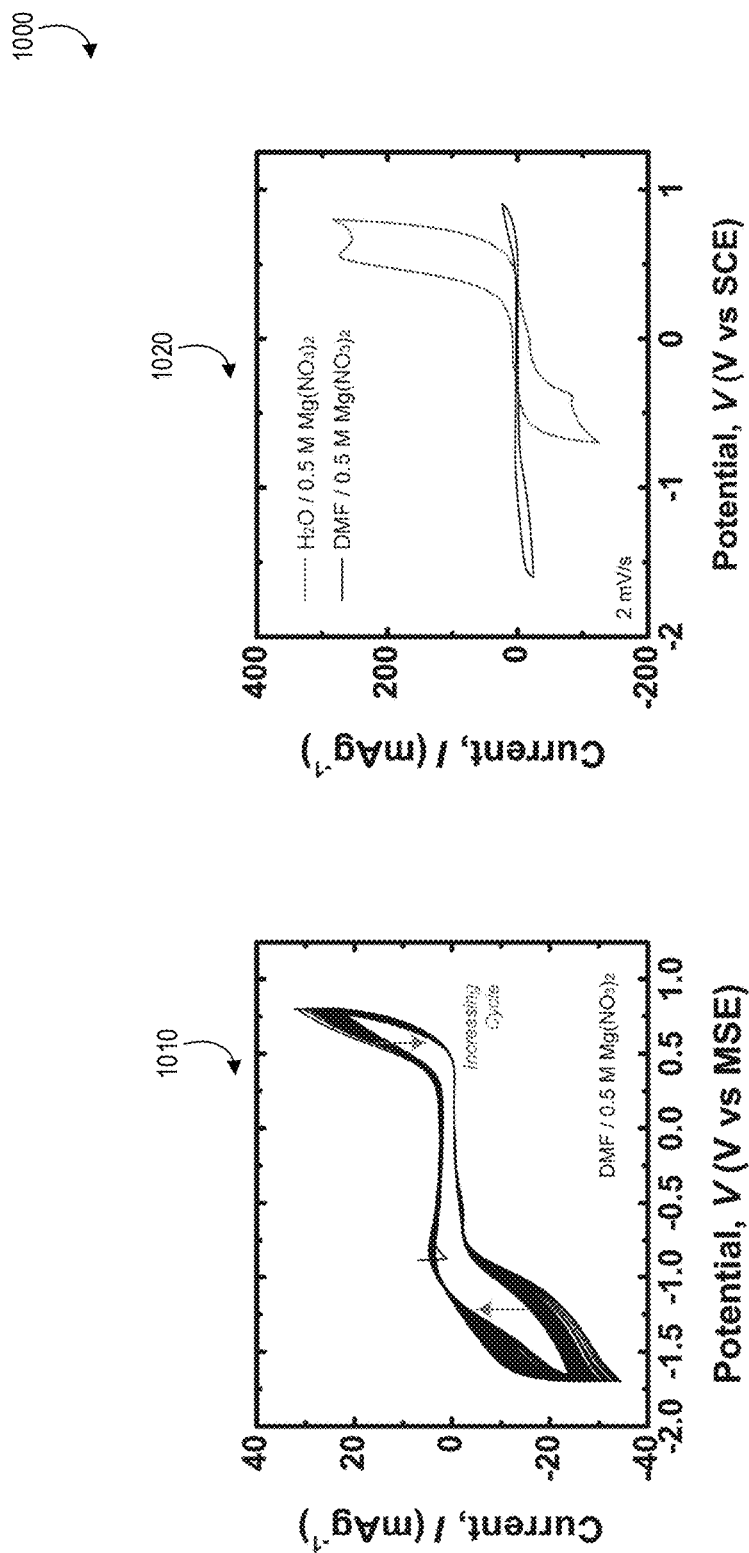

Referring to FIG. 10, data 1000 shows measurements of cyclic voltammetry of melanin in a 0.5 M $Mg(NO_3)_2$/DMF electrolyte. Graph 1010 shows that no cathodic and anodic peaks are present in CV spectra with Melanin electrodes using polar-aprotic solvents. Graph 1020 shows that the overall redox activity of Melanin in aprotic DMF is lower compared to the redox activity measured in aqueous electrolytes.

Figure 11:
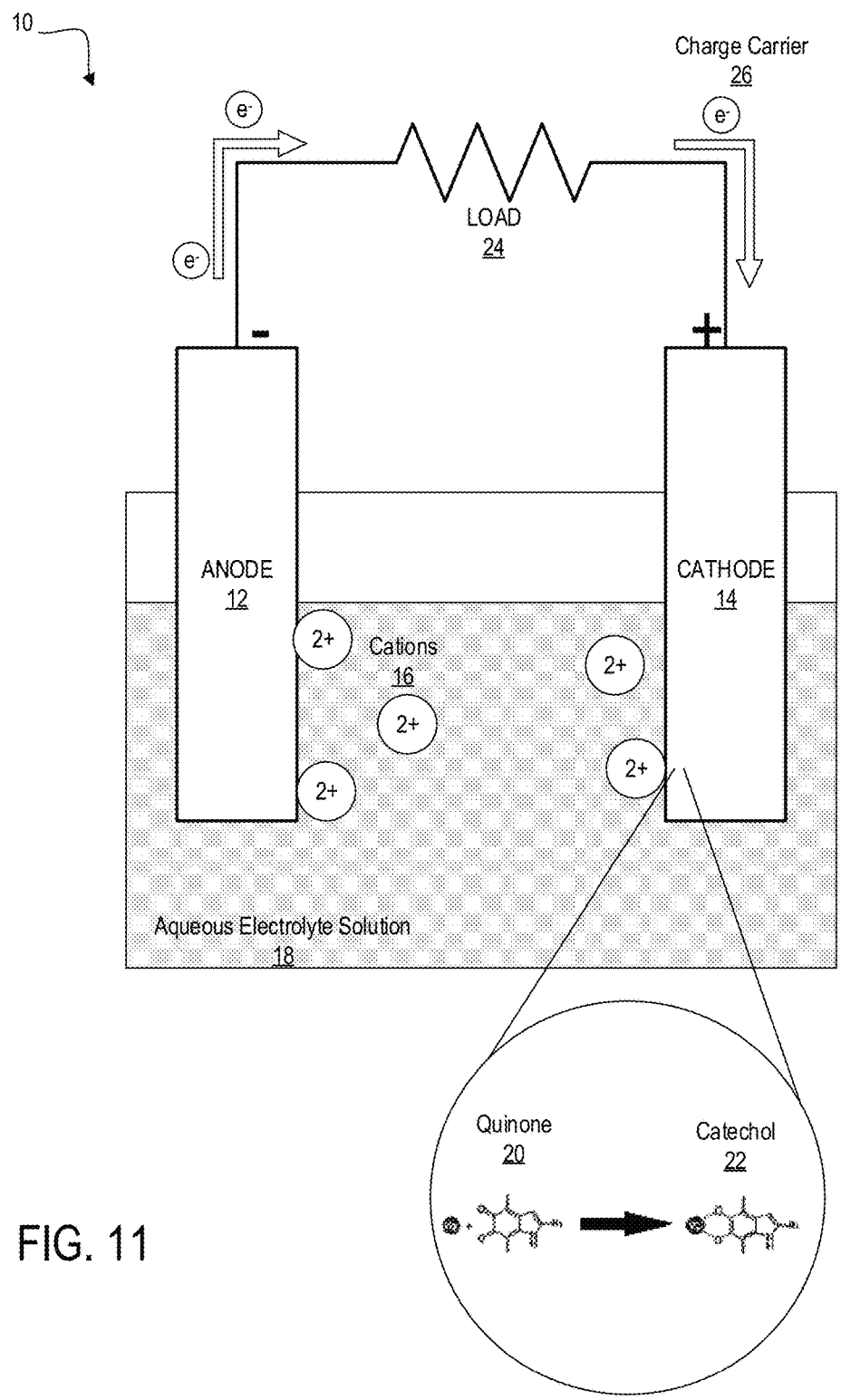
FIG. 11 includes a diagram of an example electrochemical cell.
Like reference symbols in the various drawings indicate like elements.

Referring to FIG. 11, an example diagram 10 of the electrochemical cell is shown. The electrochemical cell includes an anode 12 and a cathode 14. The anode 12 and the cathode 14 are disposed in an aqueous electrolyte solution 18. The anode 12 can produce cations 16. The cations 16 are multivalent. For example, the cations 16 can have a charge of 2+ or 3+. In some examples, the cations can be $Mg^{2+}$, $Ca^{2+}$, $Cu^{2+}$, $Zn^{2+}$, $Fe^{2+}$, $Fe^{3+}$, or $Al^{3+}$. In some examples, the cathode 14 includes a catechol-bearing melanin.

The cathode 14 is configured to react with the cations 16 using a redox reaction. A quinone 20 of the cathode 14 can be oxidized into a catechol 22 by the insertion of the cations 16. A coordinated bond between the catechol 22 and a multivalent cation can be formed from a two-proton reduction process during a discharge process. In some examples, the two-proton reduction process stabilized by a semiquinone. In some examples, during a recharge process, the catechol can be oxidized into the quinone using a two-electron oxidation process. In some examples, the two-electron oxidation process can be stabilized by a semiquinone.

The cathode can include a composite of materials. For example, the cathode can include a composition being approximately 80% the catechol-bearing melanin, 5-10% a conductor, and 5-10% a mechanical binder. In some examples, the conductor can be a carbon-black conductor. In some examples, the binder can be a Teflon binder.

The aqueous electrolyte solution 18 of the electrochemical cell includes an aqueous solution of one or more salts. For example, the aqueous solution can include $Mg(NO_3)_2$ or $MgSO_4$. The composition of the aqueous electrolyte solution 18 can depend on a metal chosen for the anode 12. The aqueous electrolyte solution is configured to transport the cations 16 from the anode 12 to the cathode 14. For example, the cations 16 can be transported during charge/discharge cycles of the electrochemical cell. The aqueous electrolyte solution 18 can provide the required molecules needed for reduction/oxidation of the melanin in the cathode 14 to occur. For example, the aqueous electrolyte solution 18 can supply the required protons for oxidation and reduction reactions. The aqueous electrolyte solution 18 can be a benign, ingestible solution such that the electrochemical cell can be ingested by a person without harmful side effects that endanger the health of the person. The aqueous electrolyte solution 18 can be an environmentally biodegradable or benign solution such that the electrolyte solution 18 does not cause adverse effects to the environment.

The cathode 14 and the anode 12 can create an electric potential. In some examples, the electric potential includes values of 1.2-1.4 V. The value of the electric potential can depend on the materials used for the anode 12 and the cathode 14. During discharge, a load 24 can be positioned to electrically connect the anode 12 and the cathode 14. Charge carriers 26 are suppled from the anode and are transported through the load 24 to the cathode 16 to create a current. A current density can depend on the materials used for the anode 12 and the cathode 14. Both the voltage and the current density supplied by the electrochemical cell can be adjusted by adjusting the anode 12 and cathode 14 compositions. As shown in FIG. 11, quinones can be reduced into catechols during discharge. In a recharge state (not shown), the charge carriers 26 can be supplied to the anode 12 and removed from the cathode 14. In some examples, in a discharge state, the catechol 22 of the cathode can be oxidized into a quinone and the multivalent cation 16 can be extracted.

In a variation of the electrochemical cell of FIG. 11, the anode of the electrochemical cell includes magnesium. The anode can produce magnesium cations with a 2+ charge ($Mg^{2+}$) during a discharge process and receive the magnesium cations during recharge. A cathode of the cell can include a catechol-bearing melanin. The $Mg^{2+}$ cations are transported in the aqueous electrolyte solution between the cathode and the anode during charge/recharge cycles. The melanin is configured to react to the $Mg^{2+}$ cations in a redox reaction. For example, during discharge, the $Mg^{2+}$ cations can from a coordinated bond with the catechol created by reducing the quinone. The quinone can be reduced to the catechol using a two-proton reduction process, such as a process stabilized by a semiquinone and seen in FIG. 1. The $Mg^{2+}$ cations are inserted into the catechol-bearing melanin cathode. During recharge, the $Mg^{2+}$ cations are extracted from the catechol-bearing melanin cathode. The catechol is oxidized into the quinone using a two-electron oxidation process, such as one stabilized by a semiquinone and shown in FIG. 1. During recharge, the $Mg^{2+}$ cations are transported in the aqueous electrolyte solution from the cathode to the anode. The $Mg^{2+}$ cations can reform into the anode without dendrite formation, increasing anode stability over charge/recharge cycles. As described above, the $Mg^{2+}$ cations are extracted with relatively little energy cost, and such the cathode is suitable for extraction and insertion of the $Mg^{2+}$ cations during charge/recharge cycles. In some examples, the electrochemical cell can be ingested by a user for one or more applications.

The electrochemical cell can have any conventional form factor. For example, the electrochemical cell and be a button battery, a cylindrical battery, and so forth. The form factor of the cell can be adjusted to meet industry standards for various applications. In some examples, the battery can be ingested, environmentally biodegradable or benign, and so forth. In some examples, the cell can include materials that are not environmentally benign and not intended to be ingested.

In some examples, representative potential-limited galvanostatic half-cell discharge-charge curves with potential limit of ±0.8 V (vs SCE) are shown in FIG. 4. A voltage hysteresis exists between discharge and charge processes with a magnitude of 0.7-0.8 V. The experimentally determined values of voltage hysteresis are in close agreement with the predicted values shown in Table 1, reproduced below.

TABLE 1

| Process | $\Delta G^0 (kJ\cdot mol^{-1})$ | $\Delta E_{cell}(V)$ |
|---|---|---|
| 1→2 | −73.3[a] | 0.38 |
| 2→3 | −87.4[b] | — |
| 1→3 | −160.8[c] | 0.83 |

[a]Value estimated from redox potentials of catechol groups ($\Delta E^0$)
[b]Value estimated from Lee et al.
[c]Estimated value for combined process The state function for oxidation/reduction of the melanin (e.g. see FIG. 1) can be deconstructed into two reactions. For example, the state function (1→2) is an o-quinone reduction to form the catechol. For example, the state function (2→3) is the coordinated bond formation between $Mg^{2+}$ and the catechol. The cell potential of (1→3) is 0.83 V. The source of the voltage hysteresis is the asymmetry of bond dissociation energy of $Mg^{2+}$ between o-quinones and catechols.

In some examples, complementary redox reactions with para-quinones such as hydroquinone require additional potentials of 0.7 V. The melanin cathodes can exhibit their maximum charge storage capacities of approximately 60 mA h $g^{-1}$ at currents of ±0.1 A $g^{-1}$. Specific capacities of melanin can be shown at different values of current densities (see e.g., FIG. 4). The charge storage capacity can be discharge rate-dependent if the cycling is similarly voltage limited for all rates. Melanin cathodes using $Mg^{2+}$ cations exhibit a normalized charge storage capacity that is approximately two times larger compared to Melanin anodes that use monovalent $Na^+$ cations. Differential capacity curves (dQ/dV vs. V) indicate that the potential associated with $Mg^{2+}$ insertion and extraction from melanin cathodes is consistent across both CV and galvanostatic charge-discharge measurements. The melanin electrodes can permit $Mg^{2+}$ insertion and removal with a high degree of stability (see e.g., FIG. 5). In some examples, the specific capacities and coulombic efficiencies are largely preserved (98-99.5% of initial values) across thirty sequential cycles at various charge/discharge currents (see e.g., FIGS. 6, 7). In some examples, melanin cathodes can reproduce stable specific capacities of 61.6±0.3 mA h g$^{-1}$ at the current density of 0.1 A g$^{-1}$. For example, these specific capacities are retained at 60.8±0.7 mA h g$^{-1}$ after cycling at the different current densities (see e.g., FIG. 5). As such, melanin electrodes can serve as robust cathode materials without degradation. In some examples, the cycle stability of melanin cathodes during Mg$^{2+}$ insertion and removal is sustained at current densities of ±0.1 A g$^{-1}$.

Specific capacities of the melanin cathodes are stable at more than 61.3±0.8 mA h g$^{-1}$ after 500 cycles (see e.g., FIG. 5). This value is comparable to the measured capacities of 60.9 mA h g-1 and 61.1 mA h g$^{-1}$ after n=10 and n=50 cycles, respectively. Coulombic efficiencies are maintained in the rage of more than 99.2%. As such, magnesium is inserted and removed within melanin cathodes in a stable manner (see e.g., FIG. 4).

The Mg$^{2+}$ insertion into and extraction from melanin electrodes can be predicted and observed using stoichiometric calculations and spectroscopic measurements. For example, galvanostatic charge/discharge curves for melanin electrodes (10 milligrams) show that approximately 8.5 µmol of Mg$^{2+}$ are exchanged during cycling. The amount of Mg$^{2+}$ (0.85 mmol g$^{-1}$) is on the same order of magnitude as the quantity of Mg$^{2+}$ that can be loaded into *Sepia* melanin (1.4-1.5 mmol g$^{-1}$). For example, this amount of Mg$^{2+}$ cations can require an approximate total effective area of 0.0970 m$^2$, such as when Mg$^{2+}$ has a projected area of 1.9 Å$^2$ in hcp configuration. In some examples, the estimated required surface area for Mg$^{2+}$ insertion is approximately two times smaller than the total surface area of melanin electrode (10 mg) as determined by BET measurements (0.199 m$^2$).

Coordination bonds between Mg$^{2+}$ and catechols in Melanin can be corroborated by Fourier-transform infrared (FT-IR) spectroscopy (see e.g., FIG. 4). The FT-IR spectra of fully reduced melanin electrodes exhibit show a distinctive stretch at 1080 cm$^{-1}$ after discharge and subsequent Mg$^{2+}$ insertion. An absorption signature is assigned to ether groups in coordination bonds between catechols and Mg$^{2+}$ (see e.g., FIG. 4). For example, the signature abolished in both pristine melanins, which do not contain Mg$^{2+}$, and in oxidized melanins, which contain o-quinones instead of catechols. In some examples, the Mg$^{2+}$ insertion into melanin electrodes can be verified using Raman spectroscopy. The Raman spectra of pristine melanin can exhibit features that are comparable to other s/-hybridized carbon materials (see e.g., FIG. 8). In some examples, the Raman spectra were deconvolved into five peaks (α-ε) that are assigned to the known prominent functional groups in melanin substituents. The Raman shift associated with these peaks remains stable after repeated charging of melanin cathodes from cycle 1-30 (see e.g., FIG. 8). An Mg$^{2+}$ insertion into melanin can produce two prominent peak shifts at 1510 (δ) and 1590 cm$^{-1}$ (β) (see e.g., FIG. 8). These signatures can be assigned to indoles (C=N) and pyrrole rings (C=C). The peak heights of features in the Raman spectra are proportional to the relative abundance of specific functionalities.

In some examples, peak heights of the group of interest can be normalized to peaks centered about 1350 cm$^{-1}$ (β). The peak assigned to C—N groups at 1350 cm$^{-1}$ remains constant during charge-discharge cycles since it does not participate in redox reactions. The relative peak heights of functionalities assigned to the following Raman shifts were largely constant during charge-discharge cycles: α, COOH at 1211 cm$^{-1}$ and γ, COO$^-$ symmetric stretching at 1451 cm$^{-1}$ (see e.g., FIG. 8). However, the relative peak height of melanin at a shift of 1510 cm$^{-1}$ (δ, C=N from indoles) increases by ~70% while the height of the peak centered about a shift of 1590 cm$^{-1}$ (ε, C=C from pyrrole rings) decreases by ~80% (see e.g., FIG. 8). As such, Mg$^{2+}$ insertion transforms the vibrational modes in chemical functionalities associated with catechol groups. Table 2 details the peak position of the Raman spectra.

TABLE 2

| | Peak Position, cm$^{-1}$ | | | | | | | |
|---|---|---|---|---|---|---|---|---|
| | (i) Pristine | (ii) 1$^{st}$ Charge | Shift Δ | (ii') 1$^{st}$ Discharge | Shift Δ | (iii) 30th Charge | Shift Δ | (iii') 30$^{th}$ Discharge | Shift Δ |
| α | 1211 | 1201 | −10 | 1206 | −5 | 1207 | −4 | 1206 | −5 |
| β | 1346 | 1342 | −4 | 1343 | −3 | 1343 | −3 | 1250 | 4 |
| γ | 1451 | 1449 | −2 | 1439 | −12 | 1449 | −2 | 1459 | 8 |
| δ | 1500 | 1503 | 3 | 1528 | 28 | 1503 | 3 | 1564 | 64 |
| ε | 1591 | 1591 | 0 | 1610 | 19 | 1589 | −2 | 1648 | 57 |

Table 2 shows peak position values of Raman spectra of pristine and charged/discharged melanin.

In some examples, the maturation of melanin cathodes is be measured by galvanostatic charge and discharge cycles starting with pristine melanin (FIG. 9). In some examples, the initial charge/discharge cycles of melanin cathodes exhibit potential profiles that are similar to pseudo-capacitors when operated in galvanostatic conditions in Mg$^{2+}$-bearing electrolytes. For example, potential plateaus during discharge and charge cycles can emerge after more than 100 cycles. As such, the charging and discharging of melanin electrodes can increase the efficiency of the redox reactions between catechols and o-quinones as the cycle number increases. For example, cycle-dependent CV spectra can also show this trend.

In some examples, the electrochemical cell can include natural melanin (e.g., NatMel, melanin from *Sepia officinalis*), magnesium nitrate (Mg(NO$_3$)$_2$), magnesium sulfate (MgSO$_4$), N,N-dimethylformamide (DMF, anhydrous), and polytetrafuoroethylene (PTFE, 200-300 µm particle size). In some examples, these materials can be the materials available from Sigma-Aldrich (St. Louis, Mo. USA) and used as received unless otherwise stated.

In some examples, melanin is suspended in ethanol (5 wt. %) and sonicated for 10 minutes (Power=80 W) using a probe sonicator. The melanin suspension can be filtered using filter paper (e.g., grade 41, Whatman, of Fisher Scientific, Pittsburgh, Pa. USA), and dried at 100° C. for 1 hour in a vacuum oven. In some examples, melanin electrodes can be prepared by combining melanin (500 mg) with PTFE as a binder in a mass ratio of 80:20. In some examples, the cathode can be prepared using approximately 80% melanin, between 5-10% conductor (e.g., carbon black), and 5-10% of a mechanical binder (e.g., Teflon). The electrode components can be blended using agate mortar and pestle. In some examples, the melanin electrodes (10 mg) can be pressed into stainless steel mesh current collector (type 304, McMaster-Carr, Cleveland, Ohio USA).

In some examples, discharge/charge cycles can be measured in 0.5 M of $Mg(NO_3)_2$ and 0.5 M of $MgSO_4$ aqueous electrolyte solutions. The specific capacity of half-cells can be calculated by multiplying the period of charge or discharge with applied current densities (current/mass of active melanin electrode material). In some examples, a three-electrode cell is configured with melanin (working electrode) and platinum (counter electrode) with a saturated calomel reference electrode (SCE). A multichannel potentiostat-galvanostat (e.g., VMP3, Bio-logic, Knoxville, Tenn. USA) was used to measure CV spectra and galvanostatic half-cell discharge-charge profiles. In some examples, the nominal surface area of melanin electrode can be 28.3 $mm^2$ (e.g., a diameter=6 mm). In some examples, CV experiments can be performed in the aqueous electrolytes of 0.5 M $Mg(NO_3)_2$ and 0.5 M $MgSO_4$ at the scan rate of 2 $mVs^{-1}$. In some examples, CV experiments in 0.5 M $Mg(NO_3)_2$ DMF electrolytes are purged with N2 for 24 hours prior to measurement.

In some examples, spectroscopic and microscopic characterization of melanin electrodes can be performed. The morphology of melanin cathodes was characterized by bright-field transmittance electron microscopy (e.g., TEM, FEI Tecnai F20 Super-Twin 200 kV, FEI, Hillsboro, Oreg., USA) and environmental scanning electron microscopy (e.g., E-SEM, FEI Quanta 600, FEI, Hillsboro, Oreg., USA). In some examples, EDX-STEM mapping is performed on melanin after 30 charge/discharge cycles. In some examples, melanin cathodes with extracted $Mg^{2+}$ (charged state) are washed with dd$H_2O$ approximately three times to remove all unbound $Mg^{2+}$ from the electrolyte. In some examples, linear atomic mapping of EDX is performed using STEM mode in Tecnai F20 operated at 200 kV. Electron dispersive spectroscopy (EDS) was performed by silicon drift detector (XMAX 80 mm EDX detector, Oxford Instruments, Oxford, England UK).

In some examples, the total surface area of melanin is determined by scaling the specific surface area of melanin (as measured by BET) by the total mass of active material (10 mg). In some examples, $Mg^{2+}$ cations can have an effective area of 1.9 $Å^2$ (ionic radius=0.74 Å), 11.41 $m^2$ $mmol^{-1}$. The number of charge/discharged $Mg^{2+}$ was calculated by multiplying the capacity at plateau (current density=0.1 A $g^{-1}$) of galvanostatic charge/discharge profiles and the mass of active material. Calculations for specific capacities were normalized by cathode (melanin) mass.

The melanin-based cathodes described herein can be used for cathode design for secondary multivalent batteries and reduce redox polarization effects while increasing access to bonding locations. The extreme cycle stability of the materials allows for this class of materials to be used as reversible $Mg^{2+}$ functional electrodes. For example, melanins contain a chemistry and microstructure that are aligned with generally accepted strategies of charge shielding and nanosizing of cathode materials. In some examples, catechols are ideally suited for cathodes in divalent cations because of the redox dependent asymmetric binding affinities for many divalent cations, such as $Mg^{2+}$. In some examples, catechols form coordination bonds with multivalent cations, such as $Ca^{2+}$, $Cu^{2+}$, $Zn^{2+}$, $Fe^{2+}$, $Fe^{2+}$, and $A^{3+}$. Promiscuous coordination bond formation may be leveraged in batteries with many multivalent cations. In some examples, cation-binding affinities are roughly four times stronger in the fully reduced catechol, such as during discharge, compared to the fully oxidized o-quinones, such as during recharge. The asymmetry in bond energetics can facilitate reversible insertion and removal of $Mg^{2+}$ during cycling. As such, catechols play an integral role during charge and discharge cycles as verified by Raman and FT-IR spectra. In some examples, asymmetric bonding energies are the source for the voltage hysteresis during cycling required during charging and recharging. The kinetics of charge and discharge may be improved by increasing the density of $Mg^{2+}$ binding sites. For example, other polyol functionalities and nanometer-scale form factors with high surface area-to-volume ratios may be utilized.

In some examples, $Mg^{2+}$ ions have limited access to internal mesoporous structures during $Mg^{2+}$ insertion even though $Mg^{2+}$ ions ($a_{Mg}$=0.74 Å) are smaller than the characteristic d-spacing between extended heteroaromatic sheets (3.8 Å). In some examples, $Mg^{2+}$ may preferentially associate with catechols on the periphery of melanin granules. The measured values of charge storage capacity are 18.7% of the maximum projected capacity for melanins (321 mA h $g^{-1}$) based on a composition of a 1:1 ratio of 5,6-dihydroxyindole (DHI) and 5,6-dihydroxyindole-2-carboxylic acid (DHICA). Since many catechol sites can be inaccessible during (dis)charging cycles, which is consistent with stoichiometric estimates of $Mg^{2+}$ insertion based on space filling calculations, the catechol can be adjusted to increase the surface area. For example, the melanins can exhibit a relatively low specific surface area (19.9 $m^2$ $g^{-1}$) compared to other $sp^2$-hybridized carbon allotropes such as graphene (3100 $m^2$ $g^{-1}$) and activated carbon (2900 $m^2$ $g^{-1}$). As such, in some examples, exfoliation strategies optimized for carbon nanomaterials can be applied to melanin to increase the specific area and ultimately drive the charge storage capacity closer to the projected maximum.

Melanin-based cathodes are advantageous in aqueous Mg cells because of the structural stability in water and the relatively high density of catechol groups. Other catechol-bearing compounds with higher theoretical charge storage capacities may be used. The electrolyte will play a critical role in advancing catechol-based cathodes for secondary multivalent batteries. In some examples, aqueous electrolyte solutions can supply protons, which are required for two-electron two-proton oxidation reactions in catechols (see e.g., FIG. 10). In some examples, catechol-bearing cathodes may expand the range of electrolytes that can improve anode stability and increase the operating window of full cells. For example, melanins are stable in highly oxidizing environments and resist corrosion as they degrade primarily through free radial initiated depolymerizations. The catechols may also serve as convenient chemistries for other electrochemical storage devices such as pseudocapacitors and flow batteries.

Other embodiments are within the scope and spirit of the description claims. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of exemplary embodiments of the invention have been described. Nevertheless, it will be understood by one of ordinary skill in the art that various modifications may be made without departing from the spirit and scope of the techniques described herein.

What is claimed is:

1. An electrochemical cell comprising:
   an anode configured to produce multivalent cations during a discharge process;
   a cathode comprising a catechol-bearing melanin, the cathode configured to reversibly reduce a quinone to a catechol by an insertion of the multivalent cation during the discharge process and oxidize the catechol of the catechol-bearing melanin into the quinone by an extraction of the multivalent cation during a recharge process; and
   an aqueous electrolyte solution in which the anode and the cathode are disposed,
   wherein the aqueous electrolyte solution is configured to transport the multivalent cations between the anode and the cathode.

2. The electrochemical cell of claim 1, wherein reducing the quinone to the catechol by the insertion of the multivalent cation during the discharge process comprises:
   reducing the quinone to the catechol using a two-proton reduction process stabilized by a semiquinone; and
   forming a coordinated bond between the catechol and the multivalent cation.

3. The electrochemical cell of claim 2, wherein the multivalent cation comprises $Mg^{2+}$ and wherein a cell potential of the discharge process is greater than 0.7 volts.

4. The electrochemical cell of claim 1, wherein reversibly oxidizing the catechol of the catechol-bearing melanin into the quinone by the extraction of the multivalent cation during the recharge process comprises:
   oxidizing the catechol into the quinone using a two-electron oxidation process stabilized by a semiquinone; and
   extracting the multivalent cation from the cathode.

5. The electrochemical cell of claim 1, the catechol-bearing melanin comprising one or more eumelanin pigments.

6. The electrochemical cell of claim 1, the cathode further comprising a composition of 80% the catechol-bearing melanin, 5-10% a conductor, and 5-10% a mechanical binder.

7. The electrochemical cell of claim 1, the cathode further configured to exhibit a charge storage capacity greater than 60 $mAhg^{-1}$ after at least 500 charge-discharge cycles.

8. The electrochemical cell of claim 1, the catechol-bearing melanin comprising a surface area greater than 20 $m^2g^{-1}$, the surface area of the catechol-bearing melanin being increased relative to a characteristic surface area of the catechol-bearing melanin by dispersion of the granules of the catechol-bearing melanin using an exfoliation strategy.

9. The electrochemical cell of claim 1, the multivalent composition configured to produce one or more cations comprising $Mg^{2+}$, $Ca^{2+}$, $Cu^{2+}$, $Zn^{2+}$, $Fe^{2+}$, $Fe^{3+}$, or $Al^{3+}$.

10. The electrochemical cell of claim 1, the aqueous electrolyte solution comprising $Mg(NO_3)_2$ or $MgSO_4$.

11. The electrochemical cell of claim 1, the cathode configured to maintain a coulombic efficiency value greater than 98% after at least 500 charge-recharge cycles.

12. The electrochemical cell of claim 1, wherein a form-factor between the anode and the cathode comprises a coin cell form-factor or a cylindrical cell form-factor.

13. The electrochemical cell of claim 1, wherein the anode and the cathode together are configured to provide a cell potential of at least 1.2 volts during a charged state of the electrochemical cell.

14. The electrochemical cell of claim 1, wherein the anode, cathode, and aqueous solution are environmentally benign and ingestible.

15. An electrochemical cell comprising:
   an anode configured to produce $Mg^{2+}$ cations during a discharge process and to receive $Mg^{2+}$ cations during a recharge process;
   a cathode comprising a catechol-bearing melanin, the cathode configured to reversibly reduce a quinone to a catechol by an insertion of the $Mg^{2+}$ cation during the discharge process and oxidize the catechol of the catechol-bearing melanin into the quinone by an extraction of the $Mg^{2+}$ cation during a recharge process; and
   an aqueous $Mg(NO_3)_2$ solution in which the anode and the cathode are disposed,
   wherein the aqueous $Mg(NO_3)_2$ solution is configured to transport the $Mg^{2+}$ cations between the anode and the cathode.

16. The electrochemical cell of claim 15, wherein reducing the quinone to the catechol by the insertion of the $Mg^{2+}$ cation during the discharge process comprises:
   reducing the quinone to the catechol using a two-proton reduction process stabilized by a semiquinone; and
   forming a coordinated bond between the catechol and the $Mg^{2+}$ cation.

17. The electrochemical cell of claim 15, wherein reversibly oxidizing the catechol of the catechol-bearing melanin into the quinone by the extraction of the $Mg^{2+}$ cation during the recharge process comprises:
   oxidizing the catechol into the quinone using a two-electron oxidation process stabilized by a semiquinone; and
   extracting the $Mg^{2+}$ cation from the cathode.

18. The electrochemical cell of claim 15, the catechol-bearing melanin comprising one or more eumelanin pigments.

19. The electrochemical cell of claim 15, the cathode comprising a composition of 80% the catechol-bearing melanin, 5-10% a conductor, and 5-10% a mechanical binder.

20. The electrochemical cell of claim 15, the cathode further configured to exhibit a charge storage capacity greater than 60 $mAhg^{-1}$ after at least 500 charge-discharge cycles.

* * * * *